US012770605B2

(12) United States Patent
Lee

(10) Patent No.: US 12,770,605 B2
(45) Date of Patent: Oct. 20, 2026

(54) VIRTUAL ENGINE SOUND GENERATING SYSTEM AND METHOD OF VEHICLE WITH SHEPARD TONE

(71) Applicant: HYUNDAI MOBIS CO., LTD., Seoul (KR)

(72) Inventor: Jae Young Lee, Icheon-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 419 days.

(21) Appl. No.: 18/462,960

(22) Filed: Sep. 7, 2023

(65) Prior Publication Data

US 2024/0096309 A1 Mar. 21, 2024

(30) Foreign Application Priority Data

Sep. 15, 2022 (KR) ........................ 10-2022-0116000

(51) Int. Cl.

*G10K 15/02* (2006.01)
*B60Q 5/00* (2006.01)
*H04R 3/00* (2006.01)

(52) U.S. Cl.

CPC ............. *G10K 15/02* (2013.01); *B60Q 5/008* (2013.01); *H04R 3/00* (2013.01); *H04R 2430/01* (2013.01); *H04R 2499/13* (2013.01)

(58) Field of Classification Search

CPC .......... G10K 15/02; B60Q 5/008; H04R 3/00; H04R 2430/01; H04R 2499/13
See application file for complete search history.

(56) References Cited

U.S. PATENT DOCUMENTS

| | | | | |
|---|---|---|---|---|
| 2013/0214921 A1* | 8/2013 | Meschke | G10K 15/02 340/467 |
| 2018/0043826 A1* | 2/2018 | Every | B60C 9/00 |
| 2019/0228759 A1* | 7/2019 | Wang | B60Q 5/00 |
| 2022/0297598 A1* | 9/2022 | Hattori | G10K 15/02 |
| 2023/0319457 A1* | 10/2023 | Wang | H04R 1/22 381/86 |

FOREIGN PATENT DOCUMENTS

KR 101856935 B1 5/2018

* cited by examiner

*Primary Examiner* — Daniel R Sellers
(74) *Attorney, Agent, or Firm* — NovoTechIP International PLLC

(57) ABSTRACT

A virtual engine sound generating system and method involves generating a virtual engine sound with a Shepard tone by superposing sine waves separated by octaves, which causes an auditory illusion as if an infinite musical scale is played, and gives a driver a feeling that engine power continually increases.

10 Claims, 5 Drawing Sheets

VIRTUAL ENGINE SOUND GENERATING SYSTEM AND METHOD OF VEHICLE WITH SHEPARD TONE

CROSS-REFERENCE TO RELATED APPLICATIONS

This application claims priority under 35 U.S.C. § 119 to Korean Patent Application No. 10-2022-0116000, filed on Sep. 15, 2022, in the Korean Intellectual Property Office, the disclosure of which is incorporated herein by reference in its entirety.

TECHNICAL FIELD

The following disclosure relates to a virtual engine sound generating system and method for a vehicle, and in particular, to a virtual engine sound generating system and method of a vehicle with a Shepard tone, capable of generating a virtual engine sound of a vehicle with a Shepard tone to provide an auditory illusion phenomenon as if an engine power continually ascends to a driver, thereby improving driving immersion.

BACKGROUND

A Shepard tone is a sound that creates an illusion of sound (hearing hallucination) by making sound be heard to ascend or descend continually. A range that makes up the Shepard tone is called a Shepard range.

This Shepard tone is a sound consisting of a superposition of a plurality of sine waves separated by octaves and is defined as in Equation 1 below.

$$\text{Shepard Tone} = \sum_{i=-(N-1)/2}^{(N-1)/2} A_i \sin(2\pi 2^i f_0 t) \quad \text{[Equation 1]}$$

Here, N is the number of sine waves constituting the Shepard tone, which is an odd number, A is the amplitude of each sine wave, and $f_0$ is the fundamental frequency.

The Shepard tone creates the auditory illusion that a tone seems to continually ascend or descend in pitch but is not higher or lower in frequency. To this end, when the pitch of the sine wave approaches an upper limit, in other words, just before the end of one Shepard range, a new Shepard range is started to hide the repetition of these ranges. Through this, since a person feels that the last tone is the same as a next new tone, sound is reproduced continually and repeatedly to be heard as a sound that ascends or descends endlessly.

In addition, by simultaneously outputting notes of different octaves but having the same scale, the current sound is connected to the immediately preceding sound, thereby implementing an infinite range.

When a virtual engine sound is generated by applying such a Shepard tone, it is possible to provide a driver with an impression that the engine power continually increases due to an auditory illusion phenomenon of hearing in an infinite range, so that driving immersion may be improved.

Typically, a virtual engine sound is generated to simulate the operation of an internal combustion engine so that a frequency thereof changes according to a rotation per minute (RPM) of the engine, so that an actual driving environment and the sound of the generated virtual engine sound should match.

However, when the Shepard tone is applied as it is, the frequency of the Shepard range changes over time even in an idle situation with a fixed RPM. Accordingly, since the actual driving situation and the generated sound (virtual engine sound) do not match, the driver may feel that he/she drives in a virtual environment (game or toy, etc.) rather than the actual driving situation. That is, since the virtual engine sound is not generated by a driving unit of a vehicle but a feeling that a virtual sound is output from a separate independent sound generating device is provided, there is a problem in that quality of a driving emotion is significantly deteriorated.

SUMMARY

An embodiment of the present invention is directed to providing a virtual engine sound generating system and method of a vehicle with a Shepard tone, capable of generating a virtual engine sound by superposing sine waves separated by octaves and generating an engine sound having a continuous sense of acceleration in which the frequency increases by adding a low-frequency tone as the RPM increases, while having the characteristics of an engine sound in which frequency and bandwidth increase as RPM increases.

In one general aspect, a virtual engine sound generating system of a vehicle with a Shepard tone includes: an information input unit receiving driving-related information of a vehicle in motion; a basic signal generating unit generating an output frequency signal having a continuous phase based on a current RPM included in the driving-related information received through the information input unit for each order value applied to an engine; an intermediate signal generating unit receiving a plurality of output frequency signals having an octave intervals by applying a preset number of Shepard tones from the basic signal generating unit and combining the plurality of output frequency signals to generate an output frequency signal to which the Shepard tone for each order value is applied; an interval setting unit setting an interval for adding the output frequency signal to the output frequency signal to which the Shepard tone is applied by the intermediate signal generating unit, in consideration of a lower limit value of the output frequency for each order value; a final signal generating unit finally generating an output frequency signal to which the Shepard tone for each order value is applied by setting, as a start value, the interval for adding the output frequency signal set by the interval setting unit in the output frequency signal to which the Shepard tone by the intermediate signal generating unit is applied; and a virtual engine sound generating unit generating a virtual engine sound by adding a plurality of output frequency signals corresponding to a plurality of predetermined order values applied to the engine by using the output frequency signal for each order value by the final signal generating unit.

The virtual engine sound generating system may further include: a first amplitude adjusting unit adjusting an amplitude of the output frequency signal combined by the virtual engine sound generating unit by using an amplification factor for sensing information of an accelerator pedal sensor (APS) included in the driving-related information received through the information input unit; a second amplitude adjusting unit adjusting an amplitude of the signal having the amplitude adjusted by the first amplitude adjusting unit by using an amplification factor for a vehicle speed included in the driving-related information received through the information input unit; and a speaker output unit transmitting the signal having the amplitude adjusted by the second amplitude adjusting unit to an associated output unit to output the signal to the outside.

The intermediate signal generating unit may receive the plurality of output frequency signals, combine the received output frequency signals to generate an output frequency signal to which the Shepard tone is applied, and then adjust an amplitude using an amplification factor for the Shepard tone.

The final signal generating unit may adjust the amplitude using a fade-out and fade-in function, when the output frequency signal to which the Shepard tone based on the current RPM is applied corresponds to the interval for adding the output frequency signal set by the interval setting unit.

The final signal generating unit may adjust the amplitude of the output frequency signal to which the finally generated Shepard tone is applied, by using the amplification factor for an order value based on the current RPM.

In another general aspect, a virtual engine sound generating method of a vehicle with a Shepard tone using a virtual engine sound generating system of a vehicle with a Shepard tone in which each operation is performed by an arithmetic processing unit, including: an information input operation (S100) of receiving driving-related information including a current RPM of a vehicle in motion; a basic signal generating operation (S200) of generating an output frequency signal having a continuous phase based on a current RPM through the information input operation (S100) for each order value applied to an engine; an intermediate signal generating operation (S300) of receiving a plurality of output frequency signals having octave intervals among output frequency signals generated through the basic signal generating operation (S200) by applying a preset number of Shepard tones and combining the plurality of output frequency signals to generate an output frequency signal to which the Shepard tone for each order value is applied; an additional interval setting operation (S400) of setting an interval for adding the output frequency signal to the output frequency signal to which the Shepard tone is applied through the intermediate signal generating operation (S300), in consideration of a lower limit value of the output frequency for each order value; a final signal generating operation (S500) of finally generating an output frequency signal to which the Shepard tone for each order value is applied by setting, as a start value, the interval for adding the output frequency signal set through the additional interval setting operation (S400) in the output frequency signal to which the Shepard tone according to the intermediate signal generating operation (S300) is applied; and a virtual engine sound generating operation (S600) of generating a virtual engine sound by adding a plurality of output frequency signals corresponding to a plurality of predetermined order values applied to the engine by using the output frequency signal for each order value through the final signal generating operation (S500).

The virtual engine sound generating method may further include: a first amplitude adjusting operation (S700) of adjusting an amplitude of the output frequency signal combined through the virtual engine sound generating operation (S600) by using an amplification factor for sensing information of an accelerator pedal sensor (APS) included in the driving-related information received through the information input operation (S100); a second amplitude adjusting operation (S800) of adjusting an amplitude of the signal having the amplitude adjusted through the first amplitude adjusting operation (S700) by using an amplification factor for a vehicle speed included in the driving-related information received through the information input operation (S100); and an output operation (S900) of transmitting the signal having the amplitude adjusted through the second amplitude adjusting operation (S800) to an associated output unit to output the signal to the outside through the output unit.

The intermediate signal generating operation (S300) may include receiving the plurality of output frequency signals for each order value, combining the received output frequency signals to generate an output frequency signal to which the Shepard tone is applied, and then adjusting an amplitude using an amplification factor for the Shepard tone.

The final signal generating operation (S500) may include adjusting the amplitude using a fade-out and fade-in function, when the output frequency signal to which the Shepard tone based on the current RPM is applied corresponds to the interval for adding the output frequency signal set through the interval setting operation (S400).

The final signal generating operation (S500) may include adjusting the amplitude of the output frequency signal to which the finally generated Shepard tone is applied, by using the amplification factor for an order value based on the current RPM.

Other features and aspects will be apparent from the following detailed description, the drawings, and the claims.

DETAILED DESCRIPTION

Figure 1:
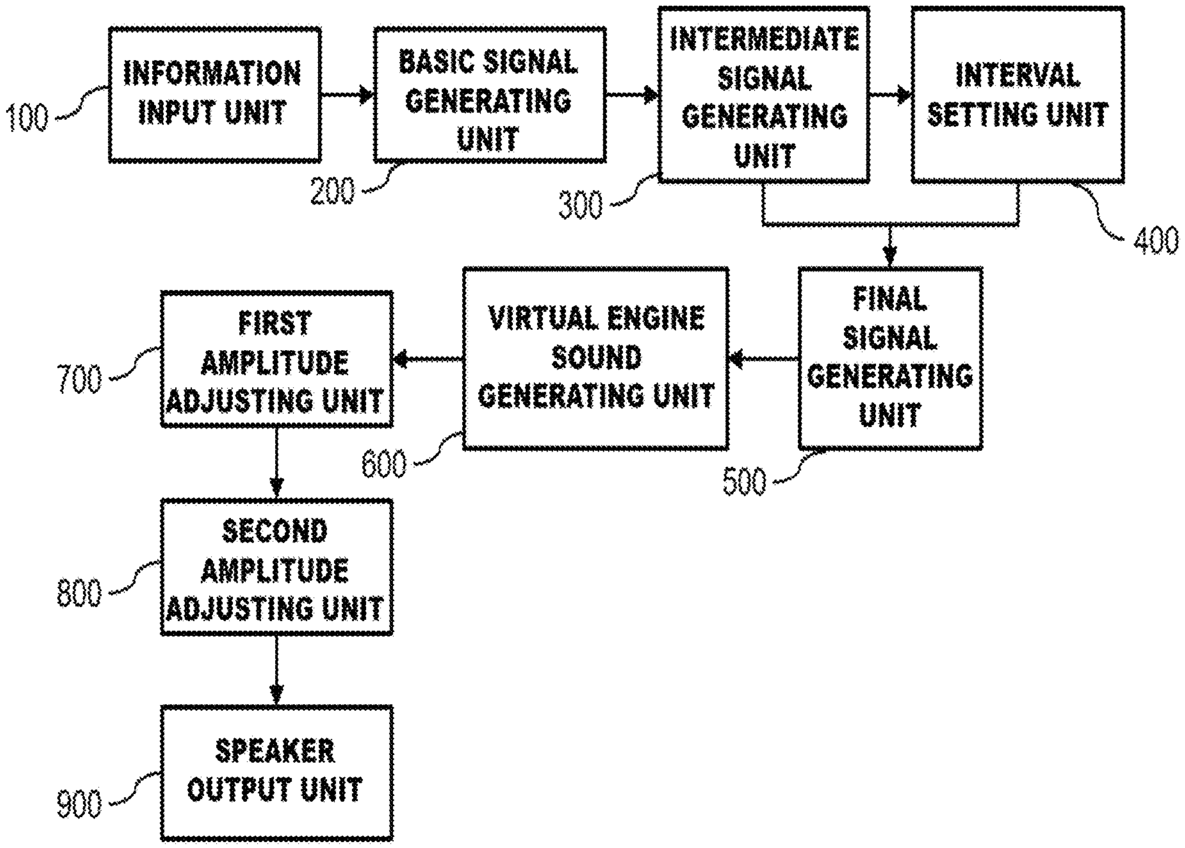
FIG. 1 is a configuration diagram illustrating a virtual engine sound generating system of vehicle with a Shepard tone according to an embodiment of the present invention.

Hereinafter, embodiments of a virtual engine sound generating system and method of a vehicle with a Sheppard tone will be described in detail with reference to the accompanying drawings.

A system refers to a set of components, including devices, mechanisms, and means, that are organized and interact regularly to perform a required function.

When of a Shepard tone as a sound created by superposing sine waves separated by octaves, which causes an auditory illusion as if an infinite musical scale is played, is applied to the generation of a virtual engine sound, a feeling that engine power continually increases may be provided to a driver, so that the quality of driving emotion may be improved.

However, if Shepard tone is simply used to generate a virtual engine sound, the frequency changes over time even in a situation where the engine RPM of the vehicle is fixed (idle situation, etc.), so the actual driving situation may not match an engine power sound (virtual engine sound) to degrade the quality of driving emotion.

In addition, when a frequency height of the general Shepard tone reaches an upper limit, a new Shepard tone is added to continually generate sound. However, in the process of continually increasing engine RPM during driving, in the case of simply adopting the Shepard tone for an output virtual engine sound, when any one Shepard tone range reaches a frequency upper limit value, a next Shepard tone range starts from a lower limit value, and at this time, the high frequency component output through the previous Shepard range may disappear, causing a problem in that the sense of acceleration disappears.

Accordingly, in order value to solve the above problems, a virtual engine sound generating system and method of a vehicle with a Shepard tone according to an embodiment of the present invention generates a virtual engine sound with a Shepard tone according to the dynamic characteristics of the vehicle.

First, the Shepard tone is applied by adding sine waves separated by octaves to the output frequency signal of each order value constituting the engine sound, and since a sound having a frequency signal of a Shepard range is generated by changing the basic frequency of each order value according to RPM, an effect as if the engine power continually increases may be provided due to an auditory illusion phenomenon.

In particular, unlike a general Shepard tone, in order value to avoid a region in which high-frequency components are reduced during acceleration, that is, to solve the problem that high-frequency components disappear in the process of continually increasing the RPM, a sense of a continually rising frequency is provided by adding a low-frequency tone as the RPM increases, without using a frequency upper limit value.

In other words, when the general Shepard tone reaches the frequency upper limit value, a next range is newly output from the frequency lower limit value, whereas the virtual engine sound generating system and method of a vehicle with a Shepard tone exclude arrival of the frequency upper limit value and include a configuration to limit to add a low-frequency tone as the RPM increases in order value to replace the Shepard range newly output from the frequency lower limit value that does not appear because an upper limit value is not reached.

In addition, the virtual engine sound generating system and method of a vehicle with a Shepard tone include a configuration of synthesizing a stable engine sound without clicking noise by generating an output frequency signal using a phase integration value to have a continuous phase.

Through this, the virtual engine sound generating system and method of a vehicle with a Shepard tone according to an embodiment of the present invention generates a virtual engine sound with a continuous acceleration feeling of increasing frequency by adding the low-frequency tone according to the increase in the RPM, while having the characteristics of an engine sound in which the frequency and bandwidth increase as the RPM of the running engine increases.

FIG. 1 is a block diagram of a virtual engine sound generating system of a vehicle with a Shepard tone according to an embodiment of the present invention.

As shown in FIG. 1, the virtual engine sound generating system of a vehicle with a Shepard tone according to an embodiment of the present invention may include an information input unit 100, a basic signal generating unit 200, and an intermediate signal generating unit 300, an interval setting unit 400, a final signal generating unit 500, and a virtual engine sound generating unit 600. Each component preferably performs an operation through an arithmetic processing unit, such as an ECU including a computer that transmits and receives data through an in-vehicle communication channel.

The virtual engine sound generating system of a vehicle with a Shepard tone according to an embodiment of the present invention naturally operates in accordance with the RPM of the engine of the vehicle in an environment in which the vehicle is driving for which the virtual engine sound is actually used.

However, in a vehicle development stage, when tuning the engine sound, the number (N) of Shepard tones to be applied to the generation of the virtual engine sound for the corresponding engine and the order value to be used are determined, and an amplification factor $A_i$ is set according to each Shepard tone, according to the RPM for each order value, according to sensing information of the APS, and according to a vehicle speed.

Each component is described in detail.

The information input unit 100 receives driving-related information of a vehicle being driven. At this time, as driving-related information, at least one of RPM, sensing information of an accelerator pedal sensor (APS), and vehicle speed is received from the vehicle in motion through CAN communication.

The basic signal generating unit 200 generates an output frequency signal having a continuous phase according to the current RPM received through the information input unit 100 for each order value applied to the engine.

Specifically, an engine sound of an internal combustion engine changes in frequency according to the RPM.

At this time, the relationship with the output frequency signal when the RPM is changed to the number of revolutions per second (RPM/60) is called an order value, and for example, the output frequency signal having a third order value may be simulated by a trigonometric function as in Equation 2 below.

$$\sin(2\pi \times RPM/60 \times 3 \times t): \quad \text{[Equation 2]}$$

Figure 2:
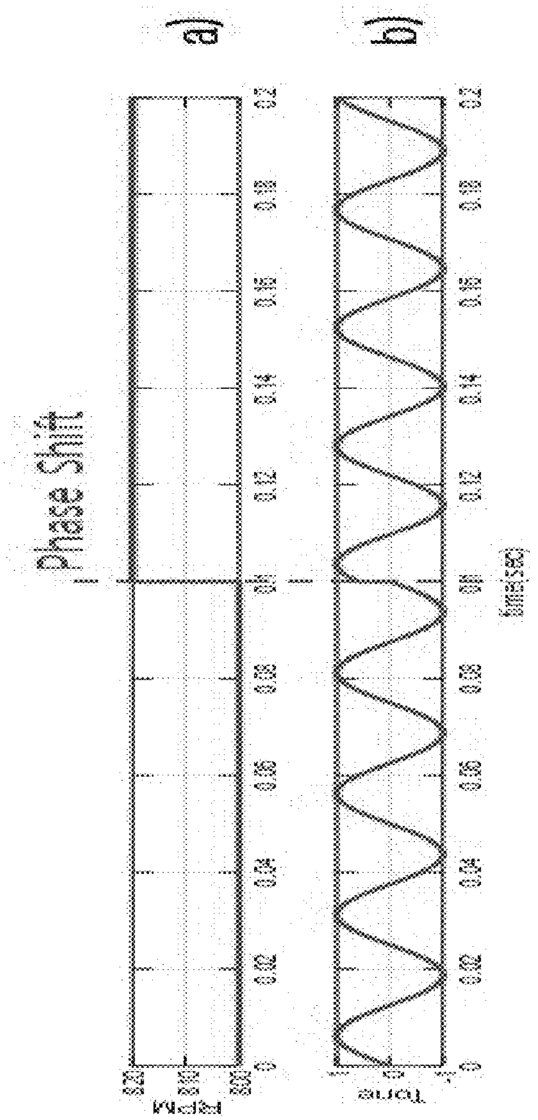
FIG. 2 is a diagram illustrating a situation in which a phase shift occurs by an output frequency signal based on a third order value of the related art.

However, since the RPM is received in the form of a periodic signal through CAN communication, the RPM is changed stepwise as shown in a) of FIG. 2. When the RPM is changed from 800 to 820 at a specific point in time, if the output frequency signal having a third order value is applied by applying Equation 2 above, a phenomenon in which the phase is rapidly shifted, without having a continuous phase value as shown in b) of FIG. 2, and clicking noise occurs to the driver.

In order value to solve this problem, the present invention integrates and applies the phase as shown in Equation 3 below through the basic signal generating unit 200 so that there is no phase change even if the RPM changes, and thus, an output frequency signal in which phase is not rapidly changed according to the current RPM, that is, having a continuous phase, is generated.

$$x_r[n]=A_r \sin \theta_r[n] \quad \text{[Equation 3]}$$

Here, A refers the amplitude of the corresponding order value, R stands for order value, $$\theta_r[n] \text{ is } \begin{cases} 0, & n=0 \\ \theta_r[n-1]+2\pi\dfrac{RPM[n]}{60}r\dfrac{1}{f_s}, & n>0 \end{cases},$$

and $f_s$ refers to a sampling frequency.

Figure 3:
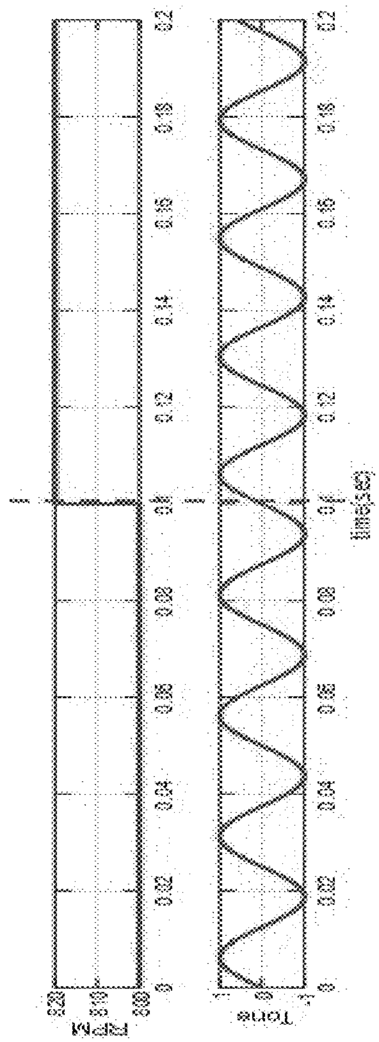
FIG. 3 is a diagram illustrating a continuous phase with an output frequency signal based on a third order value by a virtual engine sound generating system of a vehicle with a Shepard tone according to an embodiment of the present invention.

As a result, as shown in FIG. 3, it can be confirmed that, even if the RPM is changed from 800 to 820 at a specific time point, the RPM has a continuous phase without a rapid phase shift according to the current RPM.

Through this, in the virtual engine sound generating system of a vehicle with a Shepard tone according to an embodiment of the present invention, even if the output frequency signal changes due to a corresponding order value according to a change in the RPM during driving, the output frequency signal may have a continuous phase, thereby preventing the occurrence of clicking noise.

The intermediate signal generating unit 300 receives a plurality of output frequency signals having octave intervals from the basic signal generating unit 200 by applying the preset number of Shepard tones.

The intermediate signal generating unit 300 sums the plurality of output frequency signals to generate an output frequency signal to which the Shepard tone for each order value is applied. At this time, the amplitude is adjusted using the amplification factor according to the preset Shepard tone.

At this time, as described above, the number of Shepard tones and the amplification factor according to the Shepard tones are set when tuning the engine sound in the vehicle development stage.

In detail, in general, the virtual engine sound includes sine waves having multiple order values. In this case, in order value to give the generated virtual engine sound the same effect as the Shepard tone, in other words, the Shepard tone is applied to the output frequency signal according to each order value.

Simply put, the output frequency signal of each order value is constituted by the sum of a plurality of output frequency signals having an octave interval. At this time, the number of multiple output frequency signals equals the number of Shepard tones.

Through this, the output frequency signal to which the Shepard tone is applied by combining the output frequency signals of each order value at an octave interval is defined as in Equation 4 below.

$$s_r[n] = A_r \sum_{i=-(N-1)/2}^{(N-1)/2} A_i \sin\theta_{r,i}[n] \qquad \text{[Equation 4]}$$

Here, N refers to the number of Shepard tones, and is equal to $$\begin{cases} 0, & n = 0 \\ \theta_r[n-1] + 2\pi \dfrac{RPM[n]}{60} r 2^i \dfrac{1}{f_s}, & n > 0 \end{cases}.$$

The interval setting unit 400 sets an interval for adding an output frequency signal for the output frequency signal (refer to Equation 4 above) to which the Shepard tone is applied by the intermediate signal generating unit 300 in consideration of a lower limit value for an output frequency for each order value.

In detail, as described above, in the case of the general Shepard tone, when any one Shepard tone reaches a frequency upper limit value, a next Shepard tone is continuously output and changed to have the frequency lower limit value.

In other words, when Shepard tone reaches the frequency upper limit value is reached, since the next range is newly output from the frequency lower limit value, the high frequency band component disappears.

However, if these characteristics are applied to the virtual engine sound as it is, when the Shepard tone reaches the frequency upper limit value at a specific RPM while the RPM of the engine increases due to acceleration, the corresponding sound may disappear, and as a next sound is output, the sound of the high frequency band component disappears, and as a result, the sense of acceleration disappears and the quality of driving emotion is degraded.

Accordingly, in the present invention, in order value to obtain a phenomenon in which acceleration is made continuously by the auditory illusion phenomenon without using a frequency upper limit value for repetition, an interval is set by the interval setting unit 400 so that the output frequency signal in the low frequency band is continuously added.

In short, in general Shepard tones, when any one Shepard tone reaches the frequency upper limit value, the output of the next Shepard tone continues. In the present invention, in order value to solve the problem in which the high-frequency band components disappear, reaching the frequency upper limit value is limited. In this case, however, since the frequency upper limit value is not reached, the output of the next Shepard tone does not continue. Accordingly, an interval for adding an output frequency signal in a low frequency band is set so that the output of the next Shepard tone may be continued.

The frequency lower limit value of the output frequency signal for each order value is as shown in Equation 5 below.

$$\frac{RPM_{min}}{60} r 2^{-\frac{N-1}{2}} \qquad \text{[Equation 5]}$$

In consideration of this, a start value of the output frequency signal to which the Shepard tone of the lower band (lower frequency band) than the output frequency signal to which the immediately previous Shepard tone is applied is as shown in Equation 6 below.

$$\frac{RPM_{min}}{60} r 2^{-\frac{N-1}{2}} \le \frac{RPM[n]}{60} r 2^i \rightarrow \log_2 \frac{RPM_{min}}{RPM[n]} - \frac{N-1}{2} \le l \qquad \text{[Equation 6]}$$

That is, the start value of the output frequency signal to which the next Shepard tone is applied is intentionally set as much as the output frequency signal to which the Shepard tone is applied by the intermediate signal generating unit 300 is intentionally limited not to reach the frequency upper limit value.

The final signal generating unit 500 finally generates the output frequency signal to which the Shepard tone for each order value is applied as shown in Equation 7 below by setting, as a start value, the interval for adding the output frequency signal set by the interval setting unit 400 for the output frequency signal to which the Shepard tone is applied by the intermediate signal generating unit 300.

[Equation 7]

$$s_r[n] = A_r \sum_{i=\log_2 \frac{RPM_{min}}{RPM[n]} - \frac{N-1}{2}}^{(N-1)/2} A_i \sin\left(\theta_r[n-1] + 2\pi \frac{RPM[n]}{60} r 2^i \frac{1}{f_s}\right)$$

$$\text{if } n > 0, \text{ else } 0$$

When the output frequency signal to which the Shepard tone according to the current RPM is applied corresponds to the interval for adding the output frequency signal set by the interval setting unit 400, in other words, when a start value of an output frequency signal to which a next Shepard tone is applied is reached while the output frequency signal to which any one Shepard tone is applied is being output as a current virtual engine sound, so that the output frequency signal to which the next Shepard tone is applied is output, the final signal generating unit 500 adjusts an amplitude of the signal that has been output to use a fade-out function and adjusts an amplitude of the newly output signal to use a fade-in function.

That is, since the amplitude of the virtual engine sound may change in the interval where the output frequency signal to which the Shepard tone of the low frequency band is applied is added, the signal which has been output may be adjusted in amplitude to use a fade-out function and the signal which is newly output may be adjusted in amplitude to use a fade-in function so as to be naturally connected to each other.

The virtual engine sound generating unit 600 generates a virtual engine sound by combining a plurality of output frequency signals (output frequency signals to which the Shepard tone is applied) corresponding to a plurality of predetermined order values applied to the engine using the output frequency signal for each order value (refer to Equation 7 above) by the final signal generating unit 500, and in this case, the amplitude is adjusted by using an amplification factor for the preset order value according to the current RPM. This is defined as in Equation 8 below.

$$\text{Engine Sound } [n] = \sum_r s_r[n]$$ [Equation 8]

In addition, the virtual engine sound generating system of a vehicle with a Shepard tone according to an embodiment of the present invention performs a first amplitude adjusting unit 700, a second amplitude adjusting unit 800, and a speaker output unit 900 as shown in FIG. 1, before the virtual engine sound generated by the virtual engine sound generating unit 600 is output through an actual speaker.

In order value to match the actual driving environment and the virtual engine sound more precisely, an amplitude of the combined output frequency signal (refer to Equation 8 above) generated by the virtual engine sound generating unit 600 is adjusted through the first amplitude adjusting unit 700 using an amplification factor for the sensing information of the current APS received through the information input unit 100.

In addition, an amplitude of the signal amplitude-adjusted by the first amplitude adjusting unit 700 is adjusted through the second amplitude adjusting unit 800 once again by using the amplification factor for a current vehicle speed received through the information input unit 100.

Through this, the speaker output unit 900 transmits the signal whose amplitude is finally adjusted by the second amplitude adjusting unit 800 to an associated output unit, through which the signal is output to the outside.

Figure 4:
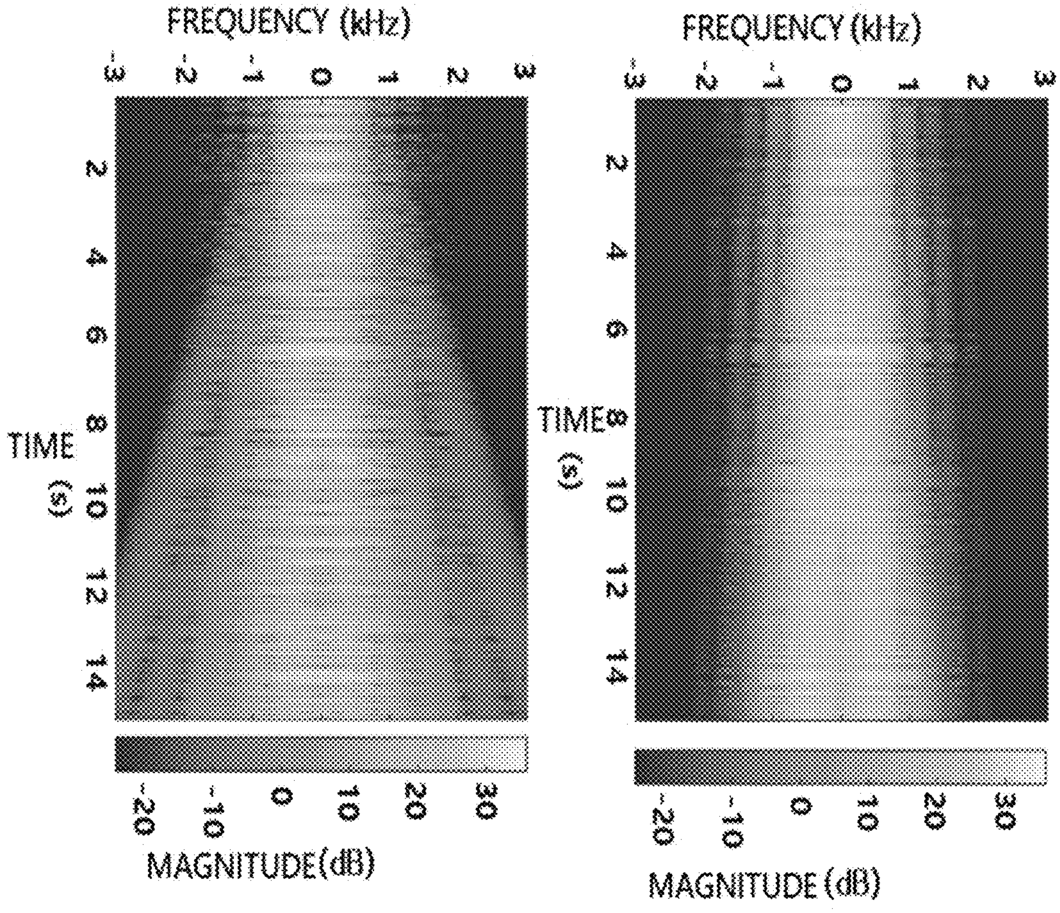
FIG. 4 is a diagram illustrating comparison between short-term Fourier transform results of a general engine sound and a virtual engine sound according to the present invention in a situation in which the RPM of a running engine increases linearly.

FIG. 4 is a diagram illustrating comparison between short-term Fourier transform results of a general engine sound and a virtual engine sound according to the present invention in a situation in which the RPM of a running engine increases linearly.

It can be seen that, unlike the existing engine sound (a of FIG. 4) in which the frequency increase is limited according to RPM, the engine sound (b of FIG. 4) of the Shepard region is generated by applying the Shepard tone.

In addition, it can be seen that the output frequency signal of the low frequency band is added in the additional interval set by the interval setting unit 400 as the RPM increases. Through this, a continuous sense of acceleration that cannot be provided by a general engine sound may be provided, so that the quality of driving emotion may be improved.

Figure 5:
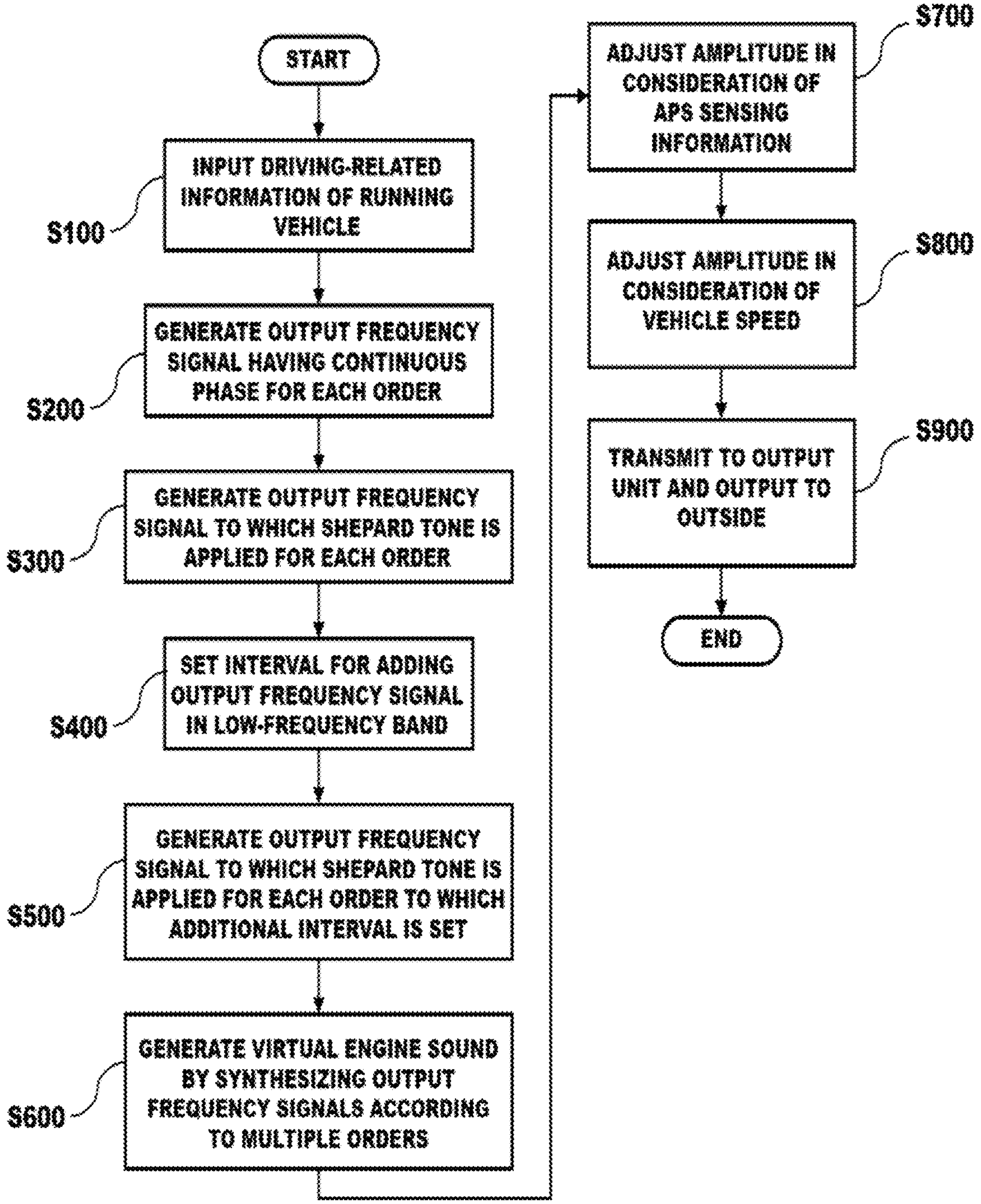
FIG. 5 is a flowchart illustrating a virtual engine sound generating method of a vehicle with a Shepard tone according to an embodiment of the present invention.

FIG. 5 is a flowchart illustrating a virtual engine sound generating method of a vehicle with a Shepard tone according to an embodiment of the present invention.

As shown in FIG. 5, a virtual engine sound generating method of a vehicle with a Shepard tone according to an embodiment of the present invention includes an information input operation (S100), a basic signal generating operation (S200), an intermediate signal generating operation (S300), an additional interval setting operation (S400), a final signal generating operation (S500), and a virtual engine sound generating operation (S600). It is preferable to use a virtual engine sound generating system of a vehicle with a Shepard tone, which is operated by an arithmetic processing unit.

In the virtual engine sound generating method of a vehicle with a Shepard tone according to an embodiment of the present invention, prior to generating a virtual engine sound, when tuning an engine sound in the vehicle development stage, the number (N) of Shepard tones to be applied to generate a virtual engine sound and the order value to be used are determined for the corresponding engine, and the amplification factor $A_i$ is set according to each Shepard tone, according to RPM for each order value, according to sensing information of APS, and according to a vehicle speed.

Each operation will be described in detail.

In the information input operation (S100), the information input unit 100 receives driving-related information of the vehicle being driven. At this time, as driving-related information, at least one of RPM, sensing information of an accelerator pedal sensor (APS), and vehicle speed is received from the vehicle in motion through CAN communication.

In the basic signal generating operation (S200), the basic signal generating unit 200 generates an output frequency signal having a continuous phase according to the current RPM through the information input operation (S100) for each order value applied to the engine.

Specifically, the engine sound of an internal combustion engine changes in frequency according to RPM.

At this time, the relationship with the output frequency signal when the RPM is changed to the number of revolutions per second (RPM/60) is called an order value, and for example, the output frequency signal having a third order value may be simulated by a trigonometric function as in Equation 2 above.

However, since the RPM is received in the form of a periodic signal through CAN communication, the RPM is changed stepwise as shown in a) of FIG. 2. When the RPM is changed from 800 to 820 at a specific point in time, if the output frequency signal having a third order value is applied by applying Equation 2 above, a phenomenon in which the phase is rapidly shifted, without having a continuous phase value as shown in b) of FIG. 2, and clicking noise occurs to the driver.

In order value to solve this problem, the present invention integrates and applies the phase as shown in Equation 3 below through the basic signal generating unit 200 so that there is no phase change even if the RPM changes, and thus, an output frequency signal in which phase is not rapidly changed according to the current RPM, that is, having a continuous phase, is generated.

As a result, as shown in FIG. 3, it can be confirmed that, even if the RPM is changed from 800 to 820 at a specific time point, the RPM has a continuous phase without rapid phase shift according to the current RPM, and through this, even if the output frequency signal changes due to a corresponding order value according to a change in the RPM during driving, the output frequency signal may have a continuous phase, thereby preventing the occurrence of clicking noise.

In the intermediate signal generating operation (S300), the intermediate signal generating unit 300 receives a plurality of output frequency signals having octave intervals, among output frequency signals generated through the basic signal generating operation (S200) by applying the preset number of Shepard tones.

Thereafter, the plurality of output frequency signals are combined to generate an output frequency signal to which the Shepard tone for each order value is applied, and at this time, the amplitude is adjusted using the amplification factor according to the preset Shepard tone.

Here, the number of Shepard tones and the amplification factor according to the Shepard tones are set when tuning the engine sound in the vehicle development stage.

In detail, in general, the virtual engine sound includes sine waves having multiple order values. In this case, in order value to give the generated virtual engine sound the same effect as the Shepard tone, in other words, the Shepard tone is applied to the output frequency signal according to each order value.

Simply put, the output frequency signal of each order value is constituted by the sum of a plurality of output frequency signals having an octave interval. At this time, the number of multiple output frequency signals equals the number of Shepard tones.

Through this, the output frequency signal to which the Shepard tone is applied by combining the output frequency signals of each order value at an octave interval is defined as in Equation 4 above.

In the additional interval setting operation (S400), the interval setting unit 400 sets an interval for adding an output frequency signal for the output frequency signal (refer to Equation 4 above) to which the Shepard tone is applied through the intermediate signal generating operation (S300) in consideration of a lower limit value for an output frequency for each order value.

In detail, as described above, in the case of the general Shepard tone, when any one Shepard tone reaches a frequency upper limit value, a next Shepard tone is continuously output and changed to have the frequency lower limit value.

In other words, when Shepard tone reaches the frequency upper limit value, since the next range is newly output from the frequency lower limit value, the high frequency band component disappears.

However, if these characteristics are applied to the virtual engine sound as it is, when the Shepard tone reaches the frequency upper limit value at a specific RPM while the RPM of the engine increases due to acceleration, the corresponding sound may disappear, and as a next sound is output, the sound of the high frequency band component disappears, and as a result, the sense of acceleration disappears and the quality of driving emotion is degraded.

Accordingly, in the present invention, in order value to obtain a phenomenon in which acceleration is made continuously by the auditory illusion phenomenon without using a frequency upper limit value for repetition, an interval is set through the additional interval setting operation (S400) so that the output frequency signal in the low frequency band is continuously added.

In short, in general Shepard tones, when any one Shepard tone reaches the frequency upper limit value, the output of the next Shepard tone continues. In the present invention, in order value to solve the problem in which the high-frequency band components disappear, reaching the frequency upper limit value is limited. In this case, however, since the frequency upper limit value is not reached, the output of the next Shepard tone does not continue. Accordingly, an interval for adding an output frequency signal in a low frequency band is set so that the output of the next Shepard tone may be continued.

The frequency lower limit value of the output frequency signal for each order value is as shown in Equation 5 above.

In consideration of this, a start value of the output frequency signal to which the Shepard tone of the lower band (lower frequency band) than the output frequency signal to which the previous Shepard tone is applied is as shown in Equation 6 above, through which the start value of the output frequency signal to which the next Shepard tone is applied is intentionally set as much as the output frequency signal to which the Shepard tone is applied through the intermediate signal generating operation (S300) is intentionally limited not to reach the frequency upper limit value.

In the final signal generating operation (S500), the final signal generating unit 500 finally generates the output frequency signal to which the Shepard tone for each order value is applied as shown in Equation 7 above by setting, as a start value, the interval for adding the output frequency signal set through the additional interval setting operation (S400) for the output frequency signal to which the Shepard tone is applied through the intermediate signal generating operation (S300).

In the final signal generating operation (S500), when the output frequency signal to which the Shepard tone according to the current RPM is applied corresponds to the interval for adding the output frequency signal set through the additional interval setting operation (S400), in other words, when a start value of an output frequency signal to which a next Shepard tone is applied is reached while the output frequency signal to which any one Shepard tone is applied is being output as a current virtual engine sound, so that the output frequency signal to which the next Shepard tone is applied is output, the final signal generating unit 500 adjusts an amplitude of the signal that has been output to use a fade-out function and adjusts an amplitude of the newly output signal to use a fade-in function.

That is, since the amplitude of the virtual engine sound may change in the interval where the output frequency signal to which the Shepard tone of the low frequency band is applied is added, the signal which has been output may be adjusted in amplitude to use a fade-out function and the signal which is newly output may be adjusted in amplitude to use a fade-in function so as to be naturally connected to each other.

In the virtual engine sound generating operation (S600), the virtual engine sound generating unit 600 generates a virtual engine sound by combining a plurality of output frequency signals (output frequency signals to which the Shepard tone is applied) corresponding to a plurality of predetermined order values applied to the engine using the output frequency signal for each order value (refer to Equation 7 above) through the final signal generating operation (S500), and in this case, the amplitude is adjusted by using an amplification factor for the preset order value according to the current RPM. This is defined as in Equation 8 above.

In addition, in the virtual engine sound generating method of a vehicle with a Shepard tone according to an embodiment of the present invention, a first amplitude adjusting operation (S700) and a second amplitude adjusting operation (S800) are performed, and an output operation (S900) is finally performed, as shown in FIG. 5, in order value to match the actual driving environment and the virtual engine sound more precisely.

In the first amplitude adjusting operation (S700), the first amplitude adjusting unit 700 adjusts the amplitude of the combined output frequency signal (refer to Equation 8 above) generated through the virtual engine sound generating operation (S600) by using the amplification factor for the sensing information of the current APS through the information input operation (S100).

Thereafter, in the second amplitude adjusting operation (S800), the second amplitude adjusting unit 800 adjusts the amplitude of the signal having an amplitude adjusted through the first amplitude adjusting operation (S700) once again by using the amplification factor for the current vehicle speed received through the information input operation (S100).

In the output operation (S900), the speaker output unit 900 transmits the signal whose amplitude is finally adjusted through the second amplitude adjusting operation (S800) to an associated output unit, through which the signal is output to the outside.

Accordingly, the virtual engine sound generating method of a vehicle with a Shepard tone according to an embodiment of the present invention generates an engine sound with a Shepard tone that can provide a continuous sense of acceleration that cannot be provided by a general engine sound, as shown in FIG. 4.

According to the virtual engine sound generating system and method of a vehicle with a Shepard tone according to the present invention as described above, by proposing a method for generating a tone having a continuous phase, an abnormality (clicking noise, etc.) occurring when a Shepard tone is added to an engine sound having multiple order values may be prevented.

In addition, by adding a low-frequency Shepard tone that differs by an octave downward as the RPM increases, which a general engine sound does not have, without applying the frequency upper limit value of the existing Shepard tone, driving immersion may be improved by continuous acceleration according to the RPM increase.

In addition, since the present invention is implemented by using the same function without using additional hardware in a general engine sound generating environment, the emotional quality of the customer for engine sound may be improved without additional cost.

The present disclosure described above may be implemented as a computer-readable code in a medium in which a program is recorded. The computer-readable medium includes any type of recording device in which data that may be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the tunnel recognition system of the present invention.

Although the preferred embodiments of the present invention have been described above, the embodiments disclosed in the present invention are not intended to limit the technical spirit of the present invention, but are only for explanation. Therefore, the technical spirit of the present invention includes not only each disclosed embodiment, but also a combination of the disclosed embodiments, and furthermore, the scope of the technical spirit of the present invention is not limited by these embodiments. In addition, those skilled in the art to which the present invention pertains may make many changes and modifications to the present invention without departing from the spirit and scope of the appended claims, and all such appropriate changes and modifications, as equivalents, are to be regarded as falling within the scope of the present invention.

What is claimed is:

1. A virtual engine sound generating system of a vehicle with a Shepard tone, the virtual engine sound generating system comprising:

an information input unit receiving driving-related information of a vehicle in motion;

a basic signal generating unit configured to generate an output frequency signal based on a current order value of RPM applied to an engine of the vehicle, the current order value being included in the driving-related information received through the information input unit, the output frequency signal having a phase that is continuous for each order value of RPM applied to the engine and when the order value of RPM applied to the engine changes;

an intermediate signal generating unit configured to receive a plurality of output frequency signals having an octave interval by applying a preset number of Shepard tones from the basic signal generating unit and combining the plurality of output frequency signals to generate an output frequency signal to which the Shepard tone for each order value is applied;

an interval setting unit setting an interval for adding the output frequency signal to the output frequency signal to which the Shepard tone for each order value is applied in consideration of a lower limit value of the output frequency for each order value;

a final signal generating unit configured to generate an output frequency signal to which the Shepard tone for each order value is applied by setting, as a start value, the interval for adding the output frequency signal in the output frequency signal to which the Shepard tone for each order value is applied; and a virtual engine sound generating unit configured to generate a virtual engine sound by combining a plurality of output frequency signals corresponding to a plurality of predetermined order values applied to the engine by using the output frequency signal for each order value by the final signal generating unit.

2. The virtual engine sound generating system of claim 1, further comprising:

a first amplitude adjusting unit configured to adjust an amplitude of the output frequency signal combined by the virtual engine sound generating unit by using an amplification factor for sensing information of an accelerator pedal sensor (APS) included in the driving-related information;

a second amplitude adjusting unit configured to adjust an amplitude of the signal having the amplitude adjusted by the first amplitude adjusting unit by using an amplification factor for a vehicle speed included in the driving-related information received through the information input unit; and a speaker output unit configured to transmit the signal having the amplitude adjusted by the second amplitude adjusting unit to an associated output unit.

3. The virtual engine sound generating system of claim 1, wherein:

the intermediate signal generating unit receives the plurality of output frequency signals, combines the received output frequency signals to generate an output frequency signal to which the Shepard tone is applied, and then adjusts an amplitude using an amplification factor for the Shepard tone.

4. The virtual engine sound generating system of claim 1, wherein:

the final signal generating unit adjusts the amplitude using a fade-out and fade-in function when the output frequency signal to which the Shepard tone based on the current RPM is applied corresponds to the interval for adding the output frequency signal set by the interval setting unit.

5. The virtual engine sound generating system of claim 1, wherein:

the final signal generating unit adjusts the amplitude of the output frequency signal to which the finally generated Shepard tone is applied by using the amplification factor for an order value based on the current RPM.

6. A virtual engine sound generating method of a vehicle with a Shepard tone using a virtual engine sound generating system of a vehicle with a Shepard tone in which each operation is performed by an arithmetic processing unit, the virtual engine sound generating method comprising:

receiving driving-related information including a current RPM of a vehicle in motion;

generating an output frequency signal based on a current order value of RPM applied to an engine of the vehicle, the current order value being received through an information input operation, the output frequency signal having a phase that is continuous for each order value of RPM applied to the engine and when the order value of RPM applied to the engine changes;

receiving a plurality of output frequency signals having an octave intervals among output frequency signals generated through the basic signal generating operation by applying a preset number of Shepard tones and combining the plurality of output frequency signals to generate an output frequency signal to which the Shepard tone for each order value is applied;

setting an interval for adding the output frequency signal to the output frequency signal to which the Shepard tone is applied through the intermediate signal generating operation in consideration of a lower limit value of the output frequency for each order value;

generating an output frequency signal to which the Shepard tone for each order value is applied by setting, as a start value, the interval for adding the output frequency signal set through the additional interval setting operation in the output frequency signal to which the Shepard tone according to the intermediate signal generating operation is applied; and generating a virtual engine sound by adding a plurality of output frequency signals corresponding to a plurality of predetermined order values applied to the engine by using the output frequency signal for each order value through the final signal generating operation.

7. The virtual engine sound generating method of claim 6, further comprising:

adjusting an amplitude of the output frequency signal combined through the virtual engine sound generating operation by using an amplification factor for sensing information of an accelerator pedal sensor (APS) included in the driving-related information;

adjusting an amplitude of the signal having the amplitude adjusted through the first amplitude adjusting operation by using an amplification factor for a vehicle speed included in the driving-related information; and transmitting the signal having the amplitude adjusted through the second amplitude adjusting operation to an associated output unit.

8. The virtual engine sound generating method of claim 6, wherein receiving the plurality of output frequency signals further comprises:

the intermediate signal generating operation includes receiving the plurality of output frequency signals for each order value, combining the received output frequency signals to generate an output frequency signal to which the Shepard tone is applied, and then adjusting an amplitude using an amplification factor for the Shepard tone.

9. The virtual engine sound generating method of claim 6, further comprising:

adjusting the amplitude of the output frequency signal to which the finally generated Shepard tone is applied using a fade-out and fade-in function, when the output frequency signal to which the Shepard tone based on the current RPM is applied corresponds to the interval for adding the output frequency signal set through the interval setting operation.

10. The virtual engine sound generating method of claim 6, further comprising:

adjusting the amplitude of the output frequency signal to which a finally generated Shepard tone is applied, by using an amplification factor for an order value based on the current RPM.

* * * * *